(12) United States Patent
Gagneur

(10) Patent No.: US 8,622,671 B2
(45) Date of Patent: Jan. 7, 2014

(54) ANTI-ROTATION LOCK DEVICE FOR A SCREWED ASSEMBLY, AN ASSEMBLY INCLUDING SUCH A DEVICE, AND THE USE OF SUCH AN ASSEMBLY IN AIRCRAFT MANUFACTURE

(75) Inventor: Didier Gagneur, Romans-sur-Isere (FR)

(73) Assignee: SKF Aerospace France, Saint Vallier sur Rhone (FR)

( * ) Notice: Subject to any disclaimer, the term of this patent is extended or adjusted under 35 U.S.C. 154(b) by 899 days.

(21) Appl. No.: 12/289,155

(22) Filed: Oct. 21, 2008

(65) Prior Publication Data

US 2009/0103998 A1   Apr. 23, 2009

(30) Foreign Application Priority Data

Oct. 22, 2007  (FR) ...................................... 07 58459

(51) Int. Cl.
*F16B 39/10*  (2006.01)
(52) U.S. Cl.
USPC ............................ 411/123; 411/198; 403/315
(58) Field of Classification Search
USPC .................... 411/119–124, 198, 221; 403/315
See application file for complete search history.

(56) References Cited

U.S. PATENT DOCUMENTS

| | | | |
|---|---|---|---|
| 599,448 A * | 2/1898 | Haskins ......................... | 411/120 |
| 824,078 A * | 6/1906 | Howell ........................... | 411/123 |
| 1,228,679 A * | 6/1917 | Jones ............................. | 411/123 |
| 1,592,965 A * | 7/1926 | Wortman ....................... | 411/120 |
| 3,736,010 A * | 5/1973 | Larkin .......................... | 403/104 |
| 4,232,978 A * | 11/1980 | Cohen ........................... | 403/317 |
| 4,423,992 A * | 1/1984 | Ankeny ......................... | 411/223 |
| 5,765,957 A * | 6/1998 | Connell ........................... | 403/46 |
| 7,179,011 B1 * | 2/2007 | Cohen ........................... | 403/315 |
| 2006/0133890 A1 | 6/2006 | Etoile et al. | |

FOREIGN PATENT DOCUMENTS

EP   1672231       6/2006
GB       743 247 A   1/1956

* cited by examiner

*Primary Examiner* — Flemming Saether
(74) *Attorney, Agent, or Firm* — Dowell & Dowell, PC

(57) ABSTRACT

An anti-rotation lock device for preventing movement in an assembly which includes an endpiece carrying a thread screwed into a tube together with a nut suitable for being screwed on the endpiece, the lock device including a first washer provided with an anti-rotation lock component and a second washer having at least one key and wherein the first or the second washer includes a lug, and the faces of the first and second washers are configured to adjustably lock them mutually against rotation. The device further includes a third washer which includes a member for locking the nut in rotation and an outer periphery of the third washer has a tab adapted to co-operate with the lug so as to lock the first or the second washer provided with the lug against rotation relative to the third washer.

11 Claims, 5 Drawing Sheets

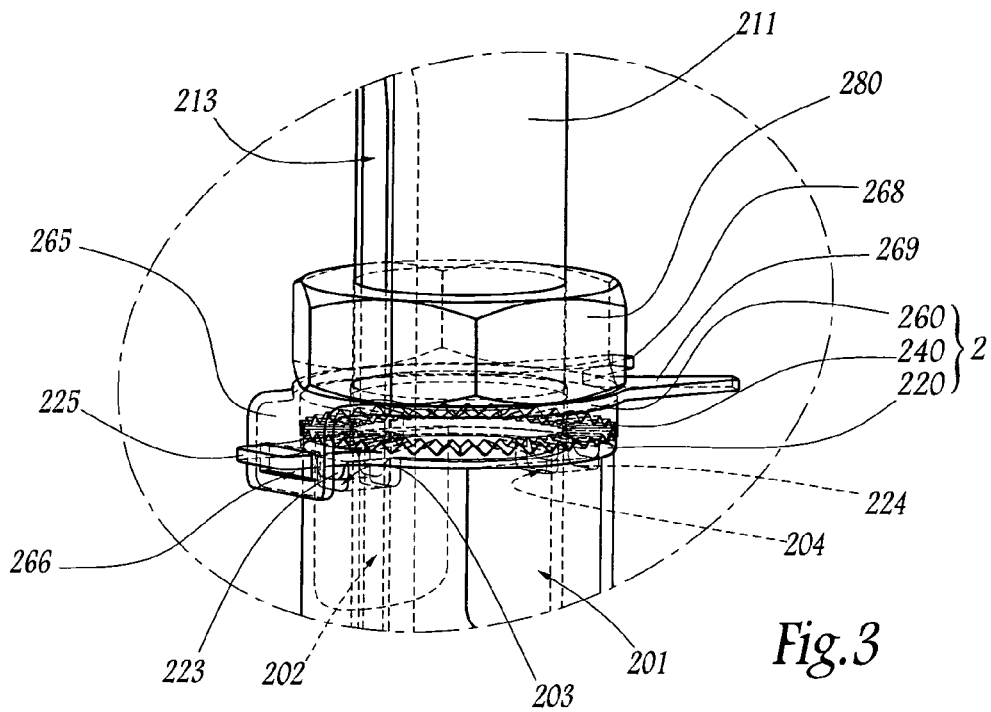
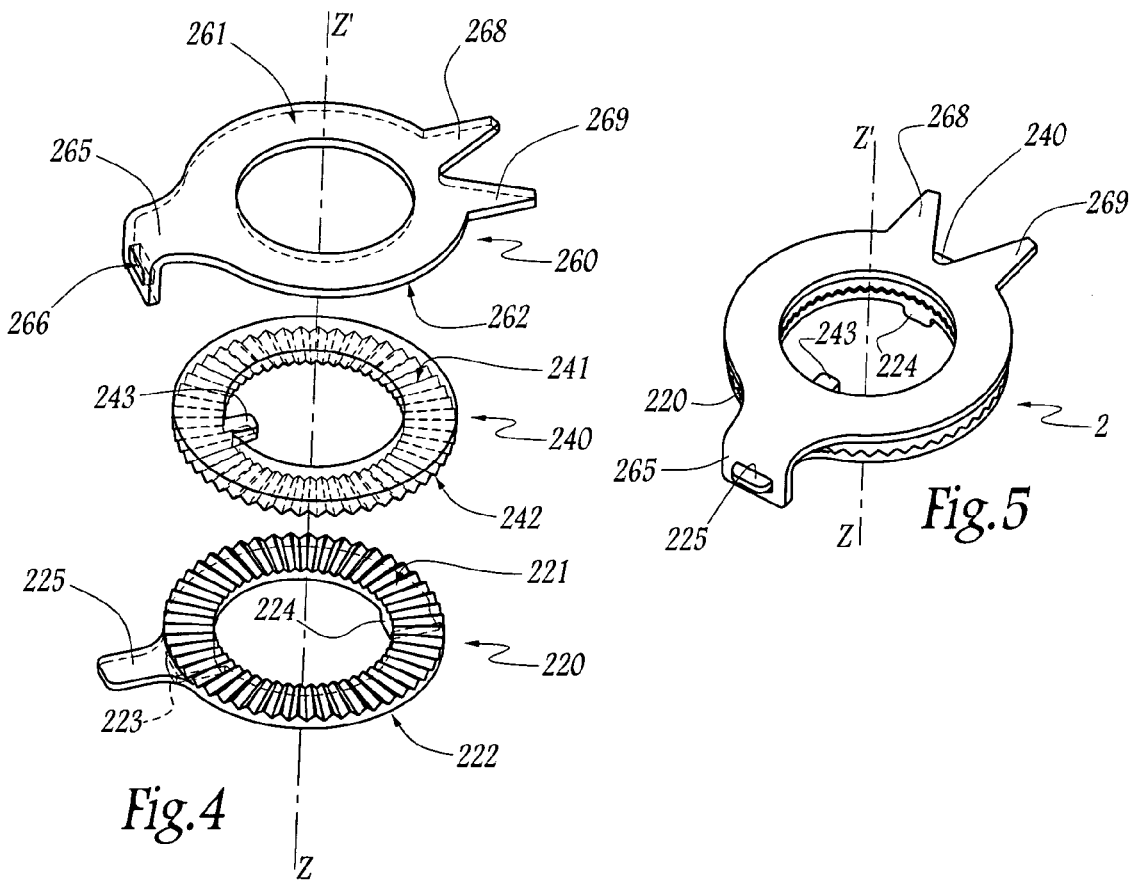

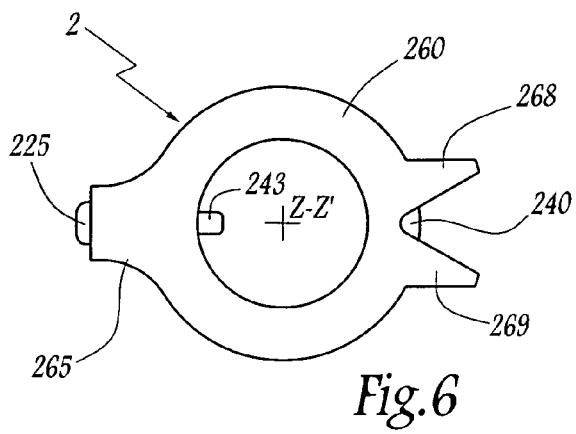
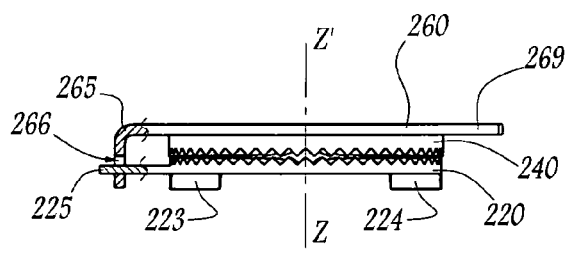
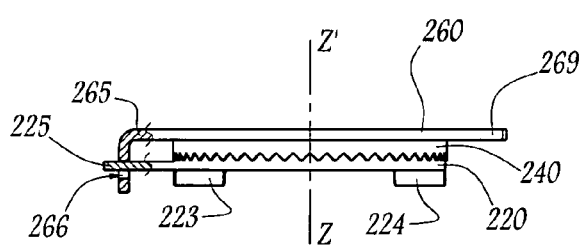
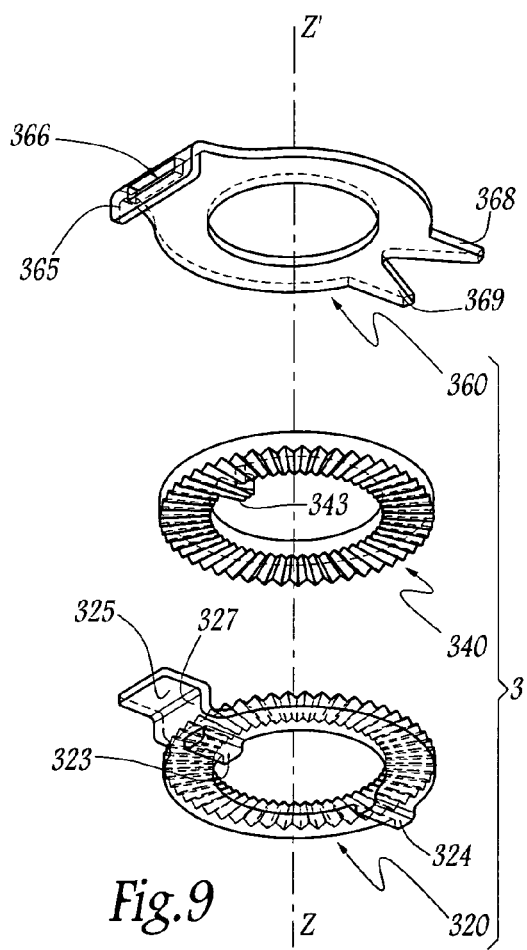

ANTI-ROTATION LOCK DEVICE FOR A SCREWED ASSEMBLY, AN ASSEMBLY INCLUDING SUCH A DEVICE, AND THE USE OF SUCH AN ASSEMBLY IN AIRCRAFT MANUFACTURE

BACKGROUND OF THE INVENTION

1. Field of the Invention

The present invention relates to an anti-rotation lock device for preventing relative movement of a screwed assembly. The invention also relates to a screwed assembly including such an anti-rotation lock device. The invention also relates to the use of such an assembly in aircraft manufacture. The invention thus relates to the field of mechanical components for screwed assembly, in particular in the field of aircraft manufacture.

2. Description of the Related Art

In the prior art, a known anti-rotation lock device serves to keep a screwed assembly together and to prevent it from coming unscrewed in untimely manner, e.g. under the effect of vibration. FIG. 1 shows a prior art screwed assembly in the loose position, the assembly being of the kind used in the field of aircraft manufacture and comprising a prior art lock device for preventing said assembly coming unscrewed. The assembly comprises a rod big end for use in aircraft manufacture and forming an endpiece 110, a tube-forming rod body 100, together with a lock device 1 and a nut 180. The endpiece 110 is provided with a threaded shank 111 that can be screwed into a corresponding thread in the tube 100 and on which the nut 180 is tightened.

The lock device 1 comprises a first washer 120, a second washer 140, and a lockwire (not shown). The washers 120 and 140 are engaged on the threaded shank 111 between the tube 100 and the nut 180. The washer 120 has two catches on its face that faces towards the tube 100, one of which can be seen in FIG. 1 with the reference 123. The catch 123 co-operates with a notch 103 situated at the end of the tube 100, thereby enabling the washer 120 to be prevented from turning relative to the tube 100. The faces of the washers 120 and 140 that are to come into contact after the lock device has been tightened have complementary serrations that form a corresponding number of means for mutually locking the washers 120 and 140 against rotation.

The inner periphery of the second washer 140 is provided with a key 143 that penetrates into a longitudinal groove 113 formed along the threaded shank 111. The washer 140 is thus prevented from turning relative to the threaded shank 111.

After the nut 180 has been tightened onto the threaded shank 111, the nut 180 and the washers 120 and 140 are compressed against the tube 100, and the washers 120 and 140 are mutually locked against rotation by their serrations interfitting.

The outer periphery of the first washer 120 has a lug 125 pierced by a hole 126. The nut 180 has three holes 181, 182, and 183 that are pierced in directions that are substantially circumferential. To lock the nut against coming unscrewed, and thus ensure that the assembly remains cohesive, an operator needs to pass a lockwire through the holes 126 and 181 to 183, and then tension the lockwire by twisting its strands together. The lockwire thus maintains contact between the nut, the washers, and the tube.

Nevertheless, such an assembly is relatively lengthy to achieve, in particular because the operator needs to thread the lockwire through the holes. In addition, there is a risk of error in the direction in which the lockwire is installed, since the pitch of the thread may be left-handed or right-handed. Furthermore, the quality of the locking against rotation as provided by the lockwire depends on the tension given to the lockwire by the operator; if the operator does not tighten the lockwire sufficiently, then the nut and thus the lock device can loosen to a certain extent.

In addition, such an assembly requires a nut that is specific, given that it is pierced, thereby increasing costs. Furthermore, the twisted ends of the lockwire can injure an operator or catch on the operator's protective garments, and that is unacceptable in certain aircraft applications.

SUMMARY OF THE INVENTION

The present invention seeks specifically to remedy those drawbacks, by proposing a device for locking a screwed assembly against rotation that is effective, reliable, simple and quick to mount, inexpensive, and without risk of catching operators.

To this end, the invention provides an anti-rotation lock device for preventing movement in an assembly comprising an endpiece provided with a thread screwed into a tube, said endpiece comprising at least one longitudinal groove extending along the axis of the thread of the endpiece, said tube comprising at least one anti-rotation lock element situated at its end for receiving the endpiece, the assembly further comprising a nut suitable for being screwed on the endpiece, and the device comprising:

a first washer having a first face provided with at least one anti-rotation lock component suitable for co-operating with said anti-rotation lock elements; and a second washer having its inner periphery provided with at least one key suitable for penetrating in said longitudinal groove;

the outer periphery of the first or second washer being associated with at least one lug, and two respective faces of the first and second washers comprising means for locking them mutually against rotation;

the device being characterized in that it further comprises a third washer including at least one member for locking the nut against rotation, and in that the outer periphery of the third washer includes at least one tab adapted to co-operate with said lug by being complementary in shape thereto so as to lock against rotation, on the one hand, the first or the second washer associated with the lug and, on the other hand, the third washer.

The term "endpiece" is used in a generic sense herein. In the field of aircraft manufacture, it can be used to designate an extender or an endpiece proper provided with a fastener component. More generally, the term "endpiece" is used herein to designate any part that includes a threaded shank, or even such a threaded shank on its own, i.e. a simple pin provided with a thread.

An anti-rotation lock device of the present invention thus presents increased reliability and simplicity of mounting. An assembly in accordance with the invention including such a device can be assembled more quickly, without risk of error, while presenting good accuracy in adjusting the length of the thread that is engaged. Furthermore, the lock device of the invention does not present any projecting part that might catch an operator. The assembly in accordance with the invention also has no need of a nut that its specifically drilled to receive the lockwire, and the anti-rotation lock device is compatible with presently-existing endpieces and tubes.

According to characteristics of the invention that are advantageous but optional, whether taken in isolation or in any technically feasible combination:

the lug is associated with the first washer;

each washer is generally flat and cylindrical in shape;

the lug presents a flat or bent profile and the tab has a bent portion forming a flap pierced by a slot adapted to receive in complementary manner a terminal portion of the lug;

the tab presents a Z-shaped profile, and the lug presents a flat or bent profile together with a slot adapted to receive, in complementary manner, a terminal portion of the tab;

the means for locking the first and second washers against mutual rotation comprise two series of complementary serrations;

the member for locking the nut against rotation comprise two tongues that extend from the outer periphery of the third washer and that are foldable against the nut; and the first and second washers are made of a hard material, and the third washer is made of a ductile material.

The invention also provides an assembly comprising an endpiece having a thread for screwing in a tube, a nut suitable for being screwed on the endpiece, said endpiece comprising at least one longitudinal groove extending along the axis of the thread of the endpiece, said tube comprising at least one anti-rotation lock element situated on its end for receiving the endpiece, the assembly being characterized in that it comprises an anti-rotation lock device as set out above, so as to prevent said assembly from moving.

The invention also provides the use of an assembly as set out above in aircraft manufacture, in which the tube is a rod body and the endpiece is a rod big end.

BRIEF DESCRIPTION OF THE DRAWINGS

The present invention can be well understood and its advantages also appear in the light of the following description given purely by way of example and made with reference to the accompanying drawings, in which:

FIG. 3 is a view on a larger scale showing detail III of FIG. 2;

FIG. 4 is an exploded perspective view of the FIG. 2 lock device;

FIG. 5 is a perspective view of the FIG. 4 lock device in an adjustment position;

FIG. 6 is a plan view of the FIG. 5 device;

FIG. 7 is a side view of the FIG. 5 device in its adjustment position;

FIG. 8 is a view analogous to FIG. 7 showing the lock device in the tight position of FIG. 3;

FIG. 9 is an exploded perspective view of a lock device constituting a second embodiment of the invention;

DESCRIPTION OF THE PREFERRED EMBODIMENTS

Figure 1:
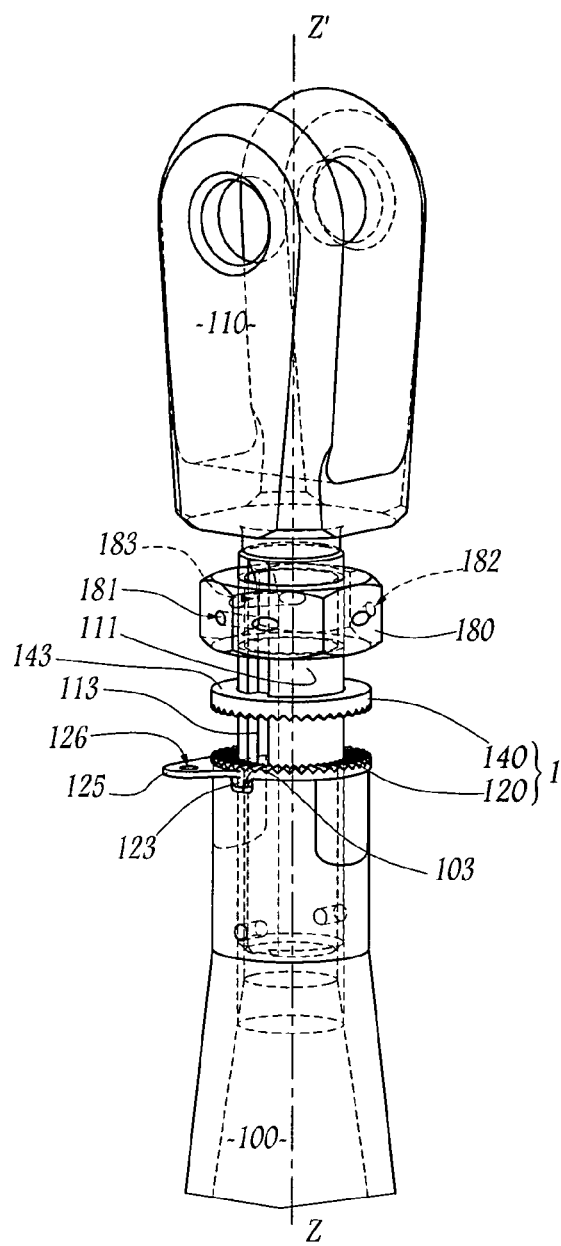
FIG. 1 is a perspective view of a prior art assembly.
Figure 2:
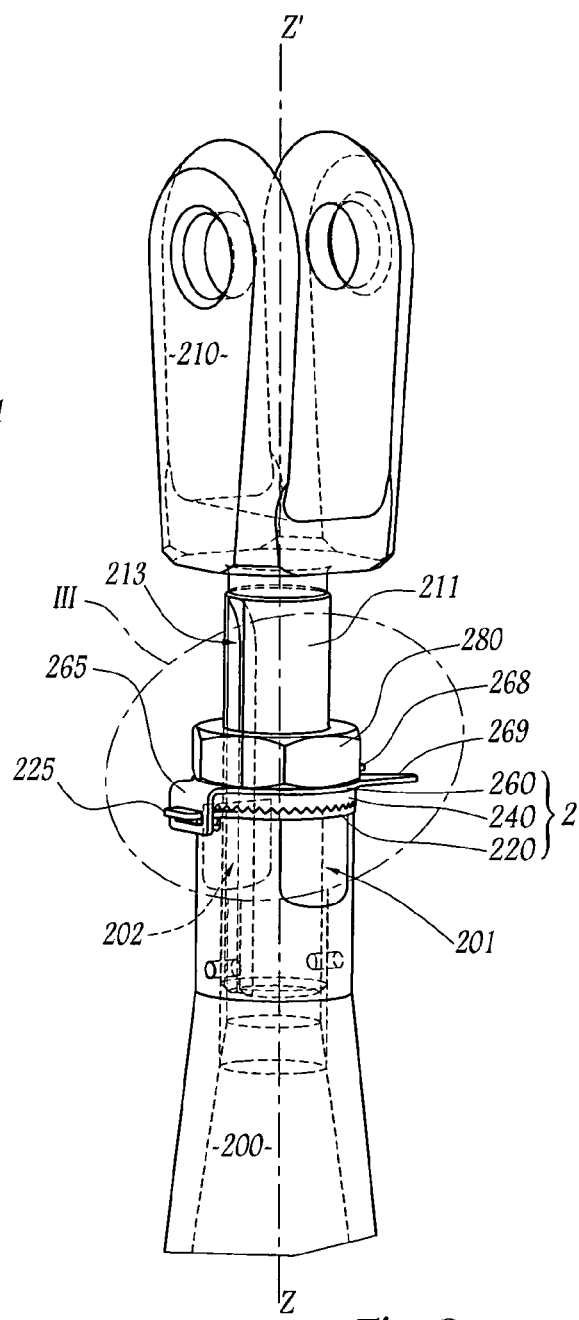
FIG. 2 is a perspective view of an assembly in accordance with the invention, shown in the tight state and including a lock device in accordance with the invention.
Figure 10:
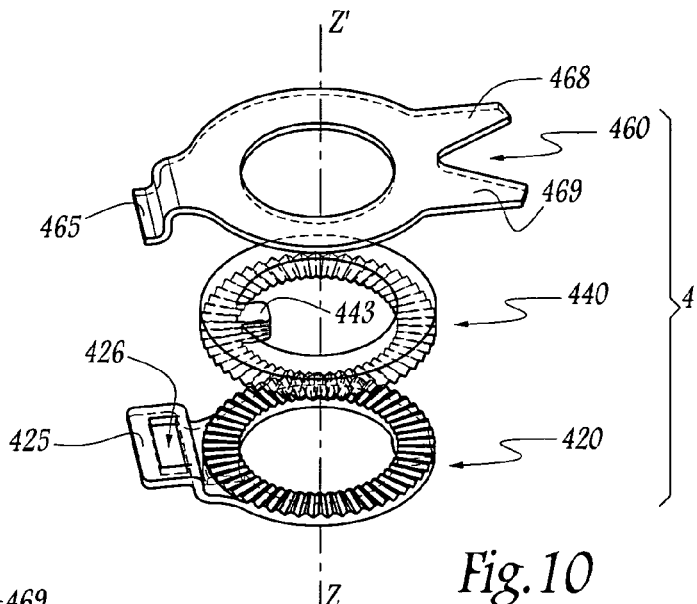
FIG. 10 is an exploded perspective view of a lock device constituting a third embodiment of the invention.
Figure 11:
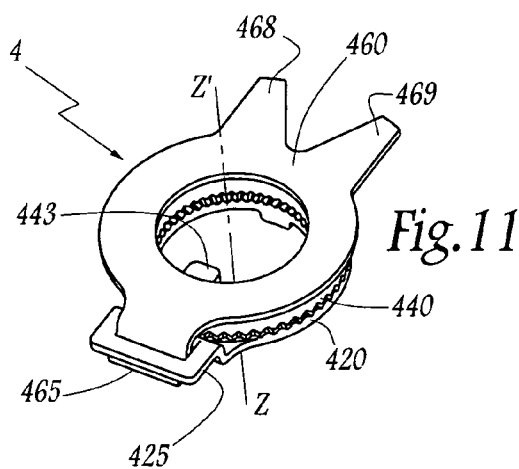
FIG. 11 is a view analogous to FIG. 5 for the device of FIG. 10.
Figure 12:
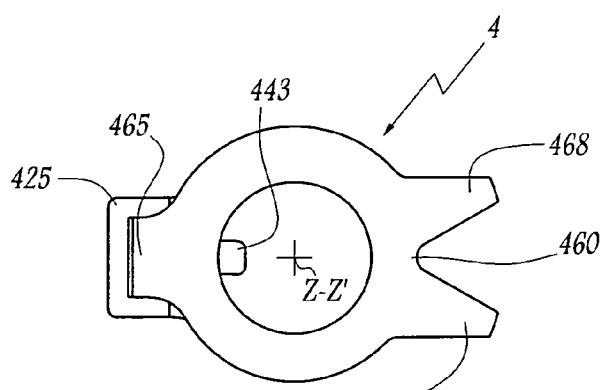
FIG. 12 is a plan view of the FIG. 10 device.
Figure 13:
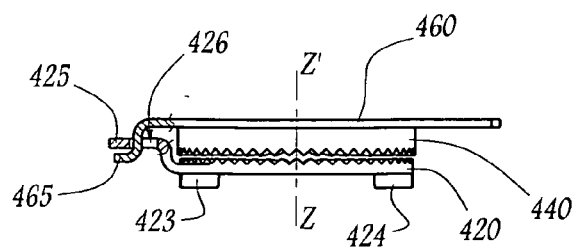
FIG. 13 is a side view of the FIG. 11 device, in an adjustment position.

The assembly shown in FIGS. 2 and 3 comprises a tube 200, an endpiece 210, and an anti-rotation lock device 2 or a device for locking the screwed assembly against rotation. Specifically, the tube 200 and the endpiece 210 are respectively constituted by a body and a fork clevis for a rod as used in aircraft manufacture. Those elements of the assembly shown in FIG. 2 that correspond to elements of the prior art assembly shown in FIG. 1 are given the same references plus 100.

The endpiece 210 is provided with a thread made on a shank 211 for screwing into a corresponding thread in the tube 200. The threaded shank 211 has a longitudinal groove 213 similar to the groove 113 that extends along the axis Z-Z' of the thread of the endpiece 210 and that is represented by dashed lines in FIG. 2.

The tube 200 has two notches 203 and 204 that are situated at the end of the tube 200 designed to receive the endpiece 210. The notches 203 and 204 are made on a common diameter of the tube 200 and they constitute elements for locking the tube 200 against rotation relative to the device 2, as explained below.

As shown in FIGS. 2 to 6, the device 2 comprises a first washer 220 and a second washer 240. The bottom face 222 of the first washer 220 has two catches 223 and 224. The catches 223 and 224 constitute components for locking the washer 220 against rotation relative to the tube 200. The catches 223 and 224 are adapted to co-operate with the notches 203 and 204 respectively, by being complementary in shape thereto.

The inner periphery of the second washer 240, i.e. its radial wall facing towards the axis Z-Z', includes a projecting key 243 that is suitable for penetrating into the longitudinal groove 213 so as to lock the second washer 240 against rotation relative to the endpiece 210.

The adjectives "inner" and "outer" are used herein to qualify the orientation of the elements to which they relate relative to the axis Z-Z' which is vertical and upwardly directed in FIGS. 2 to 8. A direction is described herein as being "radial", "axial", or "circumferential" relative to the axis Z-Z'. A surface is described herein as being "radial" or "axial" depending on the direction of a normal to said surface with reference to the axis Z-Z'. The term "longitudinal" is used to designate a direction that extends along the length of the assembly, i.e. parallel to the axis Z-Z'.

The top face 221 of the washer 220 and the bottom face 242 of the washer 240 have means for locking them mutually against rotation, these means comprising two series of radial serrations of complementary profiles. The adjectives "lower", "upper", "bottom", "top" are used herein relative to the upward direction of the axis Z-Z'. When the assembly is assembled, in the loose position or in the tight position as shown in FIGS. 2, 3 and 8, the top face 221 and the bottom face 242 face each other, as shown in FIG. 7, or they come into contact, as shown in FIG. 8.

The serrations present a triangular teeth profile. They extend radially from the axis Z-Z' over the major portion of the faces 221 and 242, thus providing a multitude of adjustment positions between the washers 220 and 240. After the serrations have been tightened against each other under drive from tightening torque, the washers 220 and 240 can no longer move relative to each other.

The outer periphery, i.e. the radially outer wall, of the first washer 220 is associated with a projecting lug 225 that contributes to locking the assembly against rotation, as explained below. In the embodiment shown in FIGS. 2 to 8, the lug 225 presents a flat profile. Its thickness is of the same order as the thickness of the non serrated portion of the first washer 220.

The device 2 also comprises a third washer 260 that is placed above and in contact with the top face 241 of the second washer 240. At the outer periphery of the third washer 260 there extends a tab 265 that is adapted to co-operate with the lug 225 by being complementary in shape thereto, so as to lock the washer 260 against rotation relative to the washer 220. For this purpose, the tab 265 has a portion bent into an L-shape that forms a free flap pierced by an oblong slot 266 and suitable for receiving the terminal portion of the lug 225. In the co-operation position, as shown in FIGS. 5 to 8, the lug 225 passes through the slot 266 and prevents relative rotation between firstly the first washer 220 and secondly the third washer 260.

After the device 2 has been mounted on the endpiece 210, and the endpiece has been screwed into the tube 200, the assembly is locked by tightening the device 2 against the end of the tube 200 by means of a nut 280. It should be observed that the nut 280 is solid, i.e. it does not require holes drilled therethrough. The three washers 220, 240, and 260 are designed to be superposed and in contact one another once the assembly is locked.

In practice, the top face of the washer 260 against which the nut 280 is to bear can be coated in a dry or greasy lubricant or with a protective substance so as to reduce the risk of it being turned. This also makes it possible to achieve tightening of the nut 280 progressively, thereby imparting uniform prestress to the thread. Similarly, the first and second washers 220 and 240 can be coated in a lubricant and/or a protective substance.

The washer 260 also has two tongues 268 and 269 that extend from its outer periphery and that are suitable for being folded towards the axis Z-Z' against at least two of the faces of the hexagonal nut 280. After being folded up and against the nut 280, the tongues 268 and 269 constitute a member for locking the nut 280 against rotation relative to the washer 260.

Each of the three washers 220, 240, and 260 is generally flat in shape and in the form of a circular cylinder about the central axis Z-Z'. The three washers 220, 240, and 260 constituting the device 2 for locking the assembly against rotation thus occupy limited axial space. Each of the three washers 220, 240, and 260 can be replaced by an annular element of non-circular section, at least for its outer periphery.

In order to withstand the mechanical stresses generated by the tightening or loosening torques, the washer 220 and the washer 240 are advantageously made of a material that is hard, such as X5CrNiCuNb 17-04 steel, or the equivalent. When the member for locking the nut 280 against rotation is constituted by the two tongues 268 and 269 suitable for folding against the nut, as shown in the figures, the washer 260 is made of a ductile material such as X2CrNi 18-9 steel, or the equivalent.

During assembly, the second washer 240 is free to rotate relative to the washers 220 and 260. This freedom to rotate and the presence of the serrations on the faces 221 and 242 enable adjustments to be performed step by step, in particular with steps of micrometer size, depending on the dimensions of the thread and of each serrations, so as to position the endpiece 210 longitudinally relative to the tube 200.

This enables the distance between the ends of a rod to be adjusted accurately. As shown in FIG. 7, this adjustment can be performed when the serrations of the washers 220 and 240 are not yet mutually interfitted. In contrast, after the serrations have been mutually interfitted, they act mechanically to prevent rotation of the washers 220 and 240, as shown in FIG. 8.

FIG. 9 shows a lock device 3 constituting a second embodiment of the invention. The description of the device 2 as given above with reference to FIGS. 2 to 8 can be transposed to the device 3. In FIG. 9, elements of the device 3 that are identical or that correspond to elements of the device 2 shown in FIGS. 2 to 8 have the same references plus 100.

The device 3 differs from the device 2 in that the lug 325 of the first washer 320 presents a Z-shaped profile instead of a flat profile, including an angled flap 327 that extends towards the third washer 360. The term "profile" is used herein to mean the section of an element on a plane containing the axis Z-Z'. As for the device 2, the terminal portion of the lug 325 is received in a rectangular slot 366 formed through the free flap of the angled tab 365.

This shape serves to reduce the axial length of the tab 365 of the washer 360 compared with the tab 265, thereby making it easier to pass a wrench to engage the flats 201 and 202 (shown in FIG. 2) so as to hold the tube 200 while the nut is being tightened on the assembly. In addition, the lug 325 can thus withstand greater tightening or loosening torques.

FIGS. 10 to 13 show a device 4 constituting a third embodiment of the invention. The description of the device 2 given above with reference to FIGS. 2 to 8 can be transposed to the device 4. Elements of the device 4 that are identical to or that correspond to elements of the device 2 are given the same references plus 200.

The device 4 differs from the device 2 in that the lug 425 and the tab 465 both present Z-shaped profiles that converge towards each other. In addition, the first washer 420 is locked relative to the third washer 460 in this embodiment by passing the tab 465 through a rectangular slot 426 made in the lug 425, i.e. the opposite configuration to the device 2. The slot 426 lies in a plane that is transverse relative to the axis Z-Z'.

This shape further reduces the axial size occupied by the tab 465 and the lug 425 in the tight position, compared with the device 2 or the device 3. In addition, with this shape, the tab 465 and the lug 425 are more robust thus enabling them to withstand higher levels of tightening and loosening torque. Furthermore, like the device 3, the device 4 makes it easier to pass a wrench for holding the tube 200.

In addition, since the slot 426 is made in the lug 425 instead of in the tab 465, it is possible to use the first washer 420 as an anchor point for a lockwire, such that the device 4 can also be used as a prior art lockwire locking device, like that shown in FIG. 1. Under such circumstances, the assembly may omit the third washer 460, providing the nut used is pierced with holes like the nut 180 in FIG. 1. In contrast, the width of the slot 426 is sufficient to pass two strands of a single lockwire. This enables the lockwire to be fitted in symmetrical manner, i.e. in a manner that does not distinguish between a left-handed pitch or a right-handed pitch for the thread, thereby avoiding any risk of error during assembly.

Like the devices 2 and 3, the construction of the device 4 also serves to prevent the third washer 460 from rotating during micrometric adjustment between the washers 420 and 440. When the threaded shank 211 is inserted into the washers of the device 4, the washer 460 can no longer be separated from the washer 420 during micrometric adjustment. The washer 420 is prevented from turning relative to the tube 200 by means of its catches 423 and 424. The washer 460 is prevented from turning relative to the washer 420 by means of its lug 465 held in the slot 426. The washer 440 is driven in rotation by means of its key 443 that is held in the groove 213 of the threaded shank 211.

Figure 14:
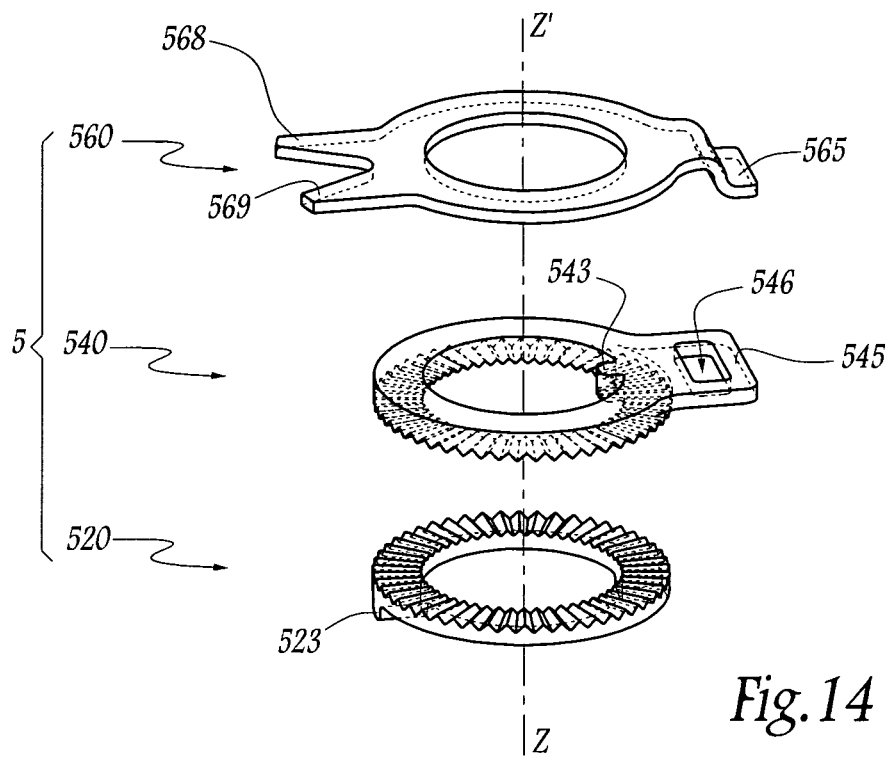
FIG. 14 is an exploded perspective view of a lock device constituting a fourth embodiment of the invention.
Figure 15:
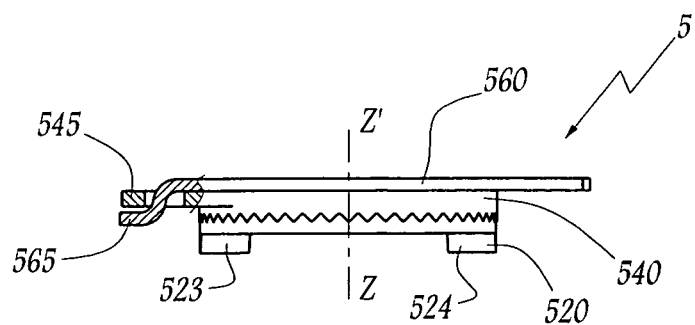
FIG. 15 is a side view of the FIG. 14 device in the tight state.

FIGS. 14 and 15 show a device 5 constituting a fourth embodiment of the invention. The description of the device 2 given above with reference to FIGS. 4 to 8 can be transposed to the device 5. Elements of the device 5 that are identical to or that correspond to elements of the device 2 are given the same references plus 300.

In the device 5, the lug 545 is associated with the outer periphery of the second washer 540 instead of with the outer periphery of the first washer 520. This makes it easier to make the anti-rotation lock device 5. Nevertheless, it can be desirable to lock the nut as directly as possible relative to the tube, and therefore to associate the lug with the first washer.

In a variant that is not shown, in order to lock the tube against rotation relative to the first washer, it is possible to provide a single catch-and-notch pair, or conversely to provide more than two catch-and-notch pairs, depending on the tightening or loosening torque that needs to be withstood. The number and the dimensions of the catch(es) and notch(es) are determined on the basis of the mechanical stresses to which they are to be subjected.

In another variant that is not shown, provision can be made to make one or more notches in the first washer and one or more catches on the tube. Such a shape is the inverse of the shape of the structures shown in the figures.

In another variant that is not shown, the slot in the lug may present a profile that is open.

The invention claimed is:

1. An anti-rotation device for preventing movement in an assembly including an endpiece provided with a thread screwed into a tube, the endpiece having at least one longitudinal groove extending parallel to a longitudinal axis of the thread of the endpiece, the tube including at least one anti-rotation lock element situated at its end for receiving the endpiece, the assembly further including a nut for being screwed on the endpiece, and the device comprising:
a first washer having a first face provided with at least one anti-rotation lock component suitable for engaging with the anti-rotation lock element;
a second washer having an inner periphery provided with at least one key for penetrating in the longitudinal groove;
an outer periphery of one of the first or second washer having at least one outwardly projecting lug, and opposing faces of the first and second washers each including a series of complementary serrations for locking the first and second washers mutually against rotation and which complementary serrations permit step by step adjustment positions to be created between the first and second washers; and
the device further comprising a third washer including at least one member for locking the nut against rotation, and wherein an outer periphery of the third washer includes at least one outwardly projecting tab adapted to co-operate and engage with the outwardly projection lug of the one of the first and first and second washers so as to thereby lock the third washer and the one of the first and second washers having the outwardly projecting lug against rotation.

2. A device according to claim 1, wherein the outwardly projecting lug is part of the first washer.

3. A device according to claim 1, wherein each washer is generally flat and cylindrical in shape.

4. A device according to claim 1, wherein the outwardly projecting lug has a flat profile and wherein the outwardly protecting tab has a bent portion forming a flap having a slot therein adapted to receive, in complementary manner, a terminal portion of the outwardly extending lug.

5. A device according to claim 1, wherein the outwardly extending tab has a Z-shaped profile, and wherein the outwardly extending lug has a flat profile with a slot adapted to receive, in complementary manner, a terminal portion of the outwardly extending tab.

6. A device according to claim 1, wherein the member for locking the nut against rotation includes two tongues that extend from the outer periphery of the third washer and that are foldable against the nut.

7. A device according to claim 1, wherein the first and second washers are made of a hard material, and wherein the third washer is made of a ductile material.

8. A device according to claim 1, wherein the outwardly projecting lug has a bent profile and wherein the outwardly protecting tab has a bent portion forming a flap having a slot therein adapted to receive, in complementary manner, a terminal portion of the outwardly extending lug.

9. A device according to claim 1, wherein the outwardly extending tab has a Z-shaped profile, and wherein the outwardly extending lug has a bent profile with a slot adapted to receive, in complementary manner, a terminal portion of the outwardly extending tab.

10. An assembly used in aircraft comprising; a fork clevis endpiece having a threaded end for screwing into a threaded end of a tube, a nut screwed on the endpiece, the endpiece including at least one longitudinal groove extending generally parallel to an axis of the thread of the endpiece, the tube including at least one an anti-rotation lock element situated along the threaded end thereof, and an anti-rotation lock device mounted between the endpiece and the tube wherein the anti-rotation lock device includes:
a first washer having a first face provided with at least one anti-rotation lock component for engaging with the anti-rotation lock element;
a second washer having an inner periphery provided with at least one key for penetrating in the longitudinal groove;
an outer periphery of one of the first or second washer having at least one outwardly extending lug, and opposing faces of the first and second washers each including a series of complementary serrations for locking the first and second washers mutually against rotation and which complementary serrations permit step by step adjustment positions to be created between the first and second washers; and
the device further including a third washer having at least one member for locking the nut against rotation, and wherein an outer periphery of the third washer includes at least one outwardly projecting tab that co-operates and engages with the outwardly extending lug of the one of the first and first and second washers so as to thereby lock the third washer and the one of the first and second washers having the outwardly extending lug against rotation.

11. The assembly according to claim 10, in which the tube is a rod body and the endpiece is a rod big end.

* * * * *